United States Patent

[11] 3,542,347

| [72] | Inventors | Lance Herbert Goldney<br>Prospect;<br>Ronald Escott Wilmshurst, Torrens Park;<br>Frank Ramsay Hartley, Burnside,<br>South Australia |
|---|---|---|
| [21] | Appl. No. | 613,306 |
| [22] | Filed | Feb. 1, 1967 |
| [45] | Patented | Nov. 24, 1970 |
| [73] | Assignee | Christmas Island Phosphate Commission<br>Melbourne, Victoria, Australia |
| [32] | Priority | Feb. 2, 1966 |
| [33] | | Australia |
| [31] | | No. 1150/66 |

[54] FLUID BED HEATING OF DISCRETE MATERIAL
7 Claims, 1 Drawing Fig.

[52] U.S. Cl. .................................................. 263/21,
34/10, 34/57
[51] Int. Cl. ...................................................... F27b 15/00
[50] Field of Search ............................................. 263/21A,
21B; 34/10, 57A, 57T

[56] References Cited
UNITED STATES PATENTS

| 2,647,738 | 8/1953 | Trainer......................... | 263/21A |
| 2,650,084 | 8/1953 | White............................ | 263/21A |
| 2,833,622 | 5/1958 | Roberts et al................. | 263/21A |

Primary Examiner—John J. Camby
Attorney—Kinzer, Dorn & Zickert

ABSTRACT: The method and means for heating discrete material which consists in the use of a burner tube depending into a fluid bed and terminating in the fluid bed whereby the burner tube constitutes conduit means to guide a gas flow which is heated directly into the fluid bed whereby at least the major portion of the heat is discharged directly into the fluid bed while a lesser proportion of the heat may be supplied by an independent gas flow upwardly through a grate into the fluid bed.

Patented Nov. 24, 1970 3,542,347
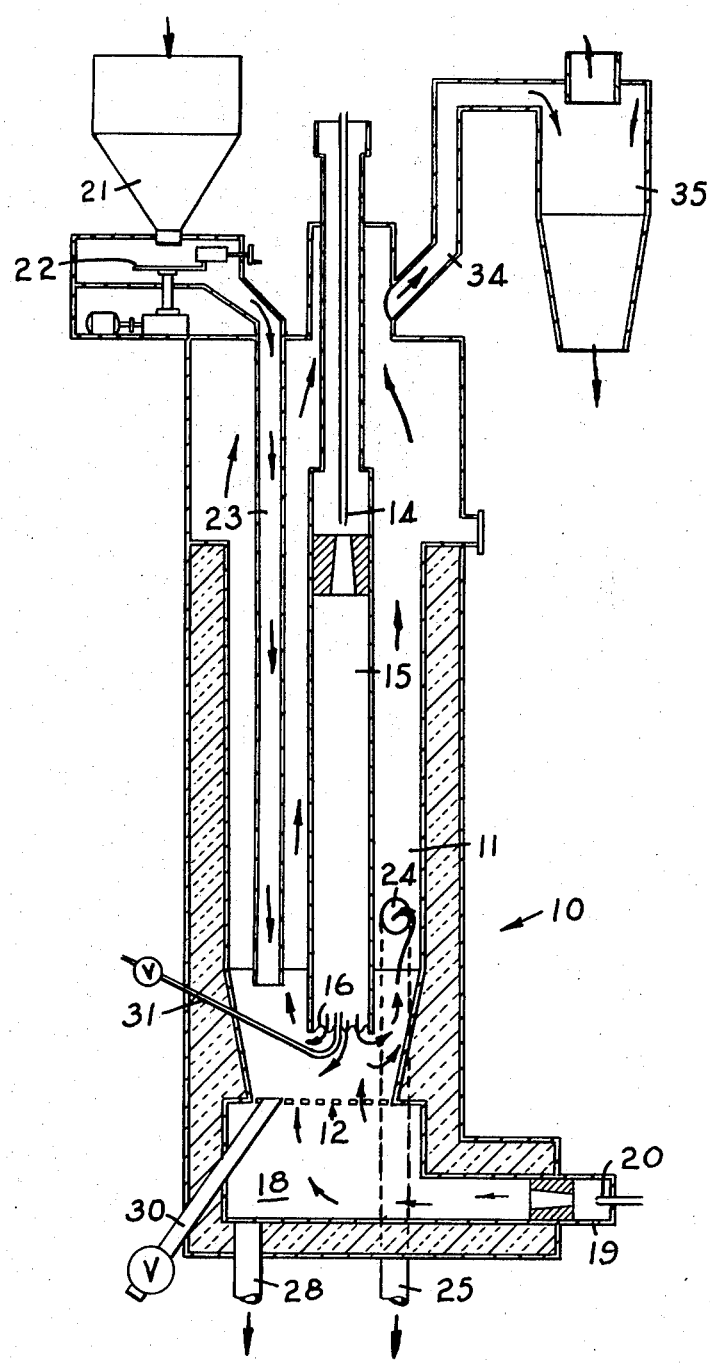

FLUID BED HEATING OF DISCRETE MATERIAL

This invention relates to a method of and means for heating discrete material to temperatures up to 700°C., and for supplying heat to carry out a chemical or physical reaction, or both, at temperatures up to 700°C.

In mineral treatment it is frequently desirable to heat discrete material to temperatures up to 700°C. A fluid-bed technique may be applied for heating such material. When heat is required to maintain operating temperatures of approximately 700°C. or higher, oil or other liquid or gaseous fuel may be injected directly into a bed of discrete particles fluidized with air. At temperatures of approximately 700°C. or higher, combustion of the fuel will readily occur, releasing the required heat.

Difficulties are encountered however if it is desired to heat a bed of fluidized material at temperatures below 700°C. Below approximately 700°C., oil or other common liquid or gaseous fuels cannot be burned satisfactorily by injection into a bed of material fluidized with air. For these lower temperature fluid bed operations, the conventional arrangement is to burn the fuel in air in an external combustion chamber and pass the hot combustion gas products through a distributor or grate at the base of the fluid bed. The temperature of the grate will normally be considerably in excess of the operating temperature in the fluidized bed.

The heat input to a conventional system is limited by the maximum operating temperature which can be tolerated by the grate of the fluid bed. There is a further limitation to grate temperature when the material to be heated in the fluidized bed has a low sintering temperature. In the event of static areas of solids contacting the grate, solids fusion can occur if the grate temperature is excessive.

With the above restrictions to the operating temperature of the grate, air in excess of that required for fuel combustion must be added to reduce the temperature of the combustion gas products before passing the hot gases through the grate. Unless the fluid bed area is enlarged, the increase in overall gas velocity will in many cases cause excessive solids entrainment. The thermal efficiency of the system is also decreased unless heat recovery stages are installed.

It is an object of this invention to provide an improved method and means of heating a fluidized bed of discrete material to temperatures up to 700°C., and thereby increase the thermal efficiency.

It is a further object of this invention to reduce the unit size of a fluid bed, for a given capacity and gas velocity, when operating at temperatures up to 700°C.

It is an object of this invention to reduce the operating temperature of a fluid bed grate (to minimize the risk of overheating discrete material when in static contact with the grate) when operating at bed temperatures up to 700°C., thereby enabling grate construction to be simplified.

The means according to the invention may, in one form comprise walls defining a fluid bed, a burner tube depending into the fluid bed and opening into the fluid bed near its lower end, the burner tube constituting conduit means to direct gas flow, a main burner in the path of said gas flow, and exhaust gas conduit communicating with the upper end of the fluid bed, the burner tube and exhaust gas conduit being arranged so that in operation heated gas issuing from the lower end of the burner tube passes upwardly through the fluid bed and outwardly through the exhaust conduit, and further so that more than half the heat introduced into the fluid bed is comprised in the heated gas issuing from the burner tube.

The method according to the invention may, in one form comprise charging the discrete material which includes charging the discrete material into the fluid bed of means according to any one of claims 1 to 6, and passing heated gas from the burner tube through the discrete material, more than half the heat introduced into the fluid bed being comprised in the heated gas.

A phosphate rock product according to the invention may, in one form, comprise amorphous iron and aluminium phosphate, formed by the process of heating discrete crystalline millisite and crandallite to a temperature of between 550°C. and 600°C.

The temperature of the combustion gases may be quite high and is not limited in any way by the material of construction of the distributor grate. Heat transfer between the hot gases and fluidized solids is quite rapid, and overheating of the bed material is therefore avoided.

The use of this invention may be further developed so that the fluidizing of the bed can be effected solely by the introduction of hot combustion gases into a bed retained in a solid base vessel. In such a case the grate is eliminated and part of the solid being treated forms a static lower layer which functions as its own hearth surmounted by the fluid bed.

An embodiment incorporating the principle of this invention will be described hereunder in some detail with reference to and is illustrated in the accompanying drawing which is a schematic section through a fluid bed which includes this invention.

A circular conventional fluid-bed reactor 10 is defined by insulated sidewalls 11 which converge towards a grate 12 at the lower end of the bed 10, to reduce the quantity of surplus air required for fluidization. A main oil burner 14 is disposed in a burner tube 15 and therewith constitutes a combustion chamber assembly which is suspended centrally inside the shaft of the fluid-bed reactor 10.

In operation, oil and primary and secondary air are metered to the oil burner 14 housed in the top section of the burner tube 15. The open lower end of the burner tube 15 is located a short distance above the distributor grate 12 and hot combustion gases are discharged directly into the fluidized bed of solids. The discharge end 16 is serrated to give an even gas distribution around the discharge periphery.

The fluid-bed walls 11 extend beneath the grate 12 to form a space or plenum (designated 18) supplied with pressure air through a conduit 19 which in this embodiment includes an ancillary gas burner 20, and this flow of air assists in fluidizing discrete material when contained in the fluid bed reactor 10.

Discrete material is fed from hopper 21 over a metering feed table 22 of conventional type, and down into the fluid bed through a charging tube 23. The discrete material gradually rises as a fluidized mass as more material is fed into the fluid bed, and "overflows" through an aperture 24 in the wall 11, discharging through pipe 25. Any material which drops through grate 12 into the plenum 18 discharges therefrom (as treated product) through pipe 28. Pipe 30 constitutes a bottom bed discharge pipe. Tube 31 provides gas sampling means for testing of gases of combustion within the burner tube 15. Exhaust gases pass through an upper conduit 34 and a clearing cyclone 35.

The main oil burner 14 and ancillary gas burner 20 are arranged so that at all times more than half the heat introduced into the fluid bed is comprised in heated gas issuing from the burner tube 15, and in normal operation of the above embodiment about 80 percent of heat is supplied from the gas issuing from the burner tube 15 and about 20 percent from the gas issuing from the ancillary gas burner 20. Air compression means are coupled to both burners to force flow of heated gas through the fluid bed, but are not illustrated herein.

In this embodiment the discrete bed material is phosphate rock crushed to pass ¼-inch B.S.S. screen. The phosphate rock consists mainly of the minerals millisite and crandallite, and by calcining at temperatures between 550° and 600°C., the mineral structure is changed from crystalline to amorphous form, and the phosphate is rendered citrate soluble and thus available to plant life. This change is not complete at temperatures below 500°C. and is adversely affected by temperatures much in excess of 600°C.

The burner tube (or other combustion chamber) may be of refractory material and suspended above the fluid bed with a gas outlet extending into the bed.

The burner tube 15 of the above embodiment, however, is of metal construction and immersed completely in the bed. In this case the heat transfer between the metal casing and the fluidized bed is rapid, and the operating temperature of the metal combustion chamber is closer to bed temperature than combustion gas temperature.

The methods of supplying hot combustion gases directly into a fluidized bed may be varied, and for example the hot gases may be ducted through the sides of a fluid-bed shell and discharged directly into a bed of fluidized solids. Such variations lie within the principle of the invention.

Incorporating the principle of this invention, the combustion chambers (burner tubes) supplying hot gases directly into a fluidized bed can operate at stoichiometric conditions or with a minimum of excess air, thus increasing the overall thermal efficiency, when compared with a conventional fluid-bed system operating at bed temperatures below approximately 700°C. In the conventional system, excess air or gas must be used to lower the temperature of combustion gases to safe limits for the materials of construction of the distributor grate, and to avoid possible sintering of bed material which may come in static contact with the grate. Unless heat recovery systems are employed, the heat lost in the surplus diluting air is considerable.

In practical operation, considering systems without heat recovery stages, a fluid-bed system operating at temperatures up to 700°C. and employing the principles of this invention, can operate with a fuel consumption of approximately 70 percent of a conventional fluid bed. The total air required can be reduced to approximately one-third of that required in a conventional system.

Continuous solids feed to the system of the above embodiment have been successfully conducted at rates up to 1,000 pounds per hour over a period of 4 days in the above-described fluid bed, constructed to an internal diameter of 18 inches. Temperature control within close limits (inherent in fluidized-bed systems) was maintained. The quality of products obtained was equal to that obtained when running the fluid bed as a conventional system at lower flow rates and with all the heat supplied through the distributor grate.

The invention can be applied with advantage to any fluid-bed operation where the operating temperatures are up to 700°C. Other calcination operations and also drying operations are therefore included.

As examples, in addition to the embodiment already described, the invention may be applied to the following:
 a. the preparation of gamma alumina by heating bauxite at approximately 600°C.; and
 b. the dehydration of limonite to form hematite and/or magnetite at approximately 600°C.

The invention is one of broad application where operations are in the lower temperature range up to 700°C.

We claim:

1. Means for heating discrete material comprising walls defining a fluid bed, a burner tube depending into the fluid bed and terminating in the fluid bed near its lower end, the burner tube constituting conduit means to direct a main gas flow, a main burner in the path of said gas flow, an exhaust gas conduit communicating with the upper end of the fluid bed, the burner tube and exhaust gas conduit being arranged so that in operation heated gas issuing from the lower end of the burner tube passes upwardly through the fluid bed and outwardly through the exhaust conduit, and further so that more than half the heat introduced into the fluid bed is comprised in the heated gas issuing from the burner tube.

2. Means according to claim 1 further comprising a grate, the walls extending upwardly therefrom and defining therewith the fluid bed, walls beneath the grate defining a plenum, and a gas flow conduit in communication with the plenum arranged to conduct fluidizing gas into the plenum, and thence upwardly through the grate and into the fluid bed.

3. Means according to claim 2 further comprising an ancillary burner in the path of flow of said fluidizing gas which passes upwardly through the grate, the main and ancillary burners being so arranged that about 80 percent of heat introduced into the fluid bed is comprised in gas issuing from the main burner tube and about 20 percent is comprised in gas passing through the grate.

4. Means for heating discrete material according to claim 2 wherein said walls are cylindrical for most of their length but the lower ends of said walls converge to said grate.

5. Means for heating discrete material comprising walls and a grate defining a fluid-bed reactor, the walls of the fluid-bed reactor extending upwardly from the grate, walls beneath the grate defining a plenum, a gas flow conduit in communication with the plenum arranged to conduct fluidizing gas into the plenum and thence upwardly through the grate and into the fluid bed of discrete material, a burner tube terminating in the fluid bed above the grate and opening into the fluid bed near its lower end, the burner tube constituting conduit means to direct gas flow, a main burner in the path of said gas flow, an exhaust gas conduit communicating with the upper end of the fluid-bed reactor, a hopper, a charging tube extending downwardly from beneath the hopper into the fluid bed of discrete material and arranged to guide discrete material from the hopper into the fluid bed, and an overflow aperture in the wall of the fluid-bed reactor disposed above the lower end of the charging tube and also above the lower end of the burner tube, the arrangement being such that discrete material charged into the fluid bed through the charging tube and from the hopper is fluidized by heated gas passing upwardly through the grate and also by heated gas from the lower end of the burner tube, the discrete material thereby being heated and passing outwardly through the overflow aperture in the wall of the fluid-bed reactor, and a metering feed table interposed between the base of the hopper and the upper end of the charging tube.

6. The method of heating discrete material which includes charging the discrete material into a fluid-bed reactor defined by sidewalls and a base, passing a major quantity of heated gas through the discrete material from the lower end of a burner tube extending downwardly into the fluid bed and terminating at its lower end within the discrete material, discharging exhaust gas from the fluid bed, and discharging discrete material after having been heated.

7. The method according to claim 6 wherein the base is constituted by a grate, the method further including the passing of a lesser quantity of heated gas upwardly through the grate and through the discrete material contained in the fluid bed thus assisting fluidizing of the discrete material, about 80 percent of the heat being comprised in gas issuing from the burner tube into the discrete material and about 20 percent of the heat being comprised in the gas passing upwardly through the grate.